United States Patent
Longo Areso et al.

(10) Patent No.: US 9,392,801 B2
(45) Date of Patent: Jul. 19, 2016

(54) METHOD FOR OBTAINING GUT WITH MARKS AND A MEAT PRODUCT WITH MARKS, GUT AND MEAT PRODUCTS THUS OBTAINED

(75) Inventors: Carlos Longo Areso, Pamplona (ES); Alberto Gallues Biurrun, Pamplona (ES); Jose Ignacio Recalde Irurzun, Pamplona (ES)

(73) Assignee: VISCOFAN, S.A., Pamplona (ES)

( * ) Notice: Subject to any disclaimer, the term of this patent is extended or adjusted under 35 U.S.C. 154(b) by 1489 days.

(21) Appl. No.: 12/299,858

(22) PCT Filed: May 11, 2007

(86) PCT No.: PCT/ES2007/000277
§ 371 (c)(1),
(2), (4) Date: Dec. 16, 2008

(87) PCT Pub. No.: WO2007/132044
PCT Pub. Date: Nov. 22, 2007

(65) Prior Publication Data
US 2009/0220655 A1    Sep. 3, 2009

(30) Foreign Application Priority Data

May 11, 2006   (ES) ................................. 200601215

(51) Int. Cl.
*A23L 1/31* (2006.01)
*A22C 13/00* (2006.01)
*A22C 17/10* (2006.01)

(52) U.S. Cl.
CPC .................. *A22C 13/00* (2013.01); *A22C 17/10* (2013.01); *A22C 2013/0046* (2013.01); *Y10T 428/1324* (2015.01)

(58) Field of Classification Search
CPC ................... A22C 13/00; A22C 17/10; A22C 2013/0046; Y10T 428/1324
USPC .......... 426/105, 410, 415, 138, 256; 428/34.8
See application file for complete search history.

(56) References Cited

U.S. PATENT DOCUMENTS

| | | | |
|---|---|---|---|
| 3,454,981 A | | 7/1969 | Martinek |
| 4,198,202 A | * | 4/1980 | Kleber ............................. 8/470 |
| 4,818,551 A | * | 4/1989 | Stall et al. ...................... 426/420 |
| 5,032,416 A | | 7/1991 | Niaura et al. |
| 5,762,968 A | | 6/1998 | Swaidner et al. |
| 2004/0250728 A1 | * | 12/2004 | Ikoma et al. ............... 106/31.75 |

FOREIGN PATENT DOCUMENTS

| | | |
|---|---|---|
| EP | 0738471 | 4/1996 |
| ES | 2097704 | 4/1995 |
| ES | 2131003 | 6/1997 |
| GB | 2314806 | 6/1997 |
| WO | PCT/US2004/021907 | 7/2004 |
| WO | WO 2005006889 | 1/2005 |

OTHER PUBLICATIONS

European Search Report for Application No. 07765860.7.

* cited by examiner

*Primary Examiner* — Chhaya Sayala
(74) *Attorney, Agent, or Firm* — Notaro, Michalos & Zaccaria P.C.

(57) ABSTRACT

The invention describes a process to produce a casing with marks and a meat product with marks. Said process starts from a casing by way of pleated tubular wrapping, where a coloring composition is impregnated on at least one sector of its surface to produce a casing with marks, which is optionally transferred to the stuffed meat product in said casing.

16 Claims, 5 Drawing Sheets

METHOD FOR OBTAINING GUT WITH MARKS AND A MEAT PRODUCT WITH MARKS, GUT AND MEAT PRODUCTS THUS OBTAINED

This application is the national stage entry filed under 35 USC 371 of International Application No. PCT/ES07/00277, filed May 11, 2007, which claims priority to Application No. P200601215 filed May 11, 2006.

OBJECT OF THE INVENTION

The present invention belongs to the field of casings devised for the production of stuffed meat products.

An object of the invention is a process to produce a casing with marks which constitutes the wrapping of a stuffed meat product to which said marks can also be transferred, using impregnation techniques on the previously pleated casing.

BACKGROUND OF THE INVENTION

For the production of stuffed meat products, animal intestines have been use since time immemorial as the containers. The manufactured products introduced in these casings are then subjected to various processes (cooking, fermentation . . . ) until the end food product is produced.

On the other hand, natural casings have been imitated by humans, which has given rise to the production of artificial casings. Artificial casings are tubular wrappers of very defined characteristics, which are designed for the production of food, such as, for example sausages, salami and large variety of stuffed meat products.

Artificial casings are produced of plastic material (for example, polyamides), as well as cellulose-based casings, either alone or with the reinforcement of a fibrous paper, which acts as mould for the manufacturing of the stuffed meat products with a defined diameter, as well as container for its transport and it can even have a drawing or the manufacturer's brand printed thereon. These artificial casings cannot be ingested together with the stuffed meat product and should be peeled off before final consumption.

Other artificial casings are even prepared from edible material, such as collagen extracted from cows or pigs, and give rise to casings which can be consumed together with the rest of the stuffed meat product, in a similar form to stuffed meat products produced with natural casings.

Although in some cases, especially in high-calibre casings, the casings are offered in individual portions designed for the stuffing of a food item or in balls designed for the manufacturing of a reduced number of food items, artificial casings are usually subjected to a special process called "pleating" before its sale.

In this pleating process, the casing is creased in an orderly fashion like the folds of an accordion, forming pleated tubular wrappers (called "pleated wrappings") which provide large lengths of casings in a form easy to stuff in modern automatic machines such as those disclosed in U.S. Pat. No. 3,115,668 Townsend. This pleating process and an example of its application are disclosed, for example, in U.S. Pat. No. 2,983,949 Matecki and U.S. Pat. No. 5,782,83 Stall.

During the pleating process, it is typical to add different natural substances to the casing, such as a small amount of oil to lubricate it and for it to resist the pleating process without tearing, or an interior spray which can carry different substances, such as wetting agents, e.g. water, glycerine, or agents which contribute to the subsequent easy peeling of the casing from the rest of the stuffed meat product.

The pleating process forms a series of folds in the casing similar to those of an accordion which generally follow an ordered pattern, the form of these folding patterns being the object of several patents, such as U.S. Pat. No. 3,907,003 and U.S. Pat. No. 3,988,804 (Regner) and U.S. Pat. No. 4,210,981, since they have great effect on the quantity of casing that can be compressed in a determined length of pleated wrapper, as well as the stability of the wrapper produced and in its later functioning (height and uniform interior diameters of the pleated wrapper which ensure the problem-free stuffing and uniform strength of resistance to unpleating of the casing during its stuffing).

Generally, when the casing is unpleated, creases from the folds made during the pleating process are observed. Although these folds may previously have been irregular, pleating techniques have evolved to provide a very regular and homogenous pleating process, which means that it is typical that these folds occur with a very repetitive structure. Generally, in the most typical pleating types, a helicoidal crease throughout the casing is usually observed in the casing when unpleated, which is typically known as "major or primary spiral", resulting from the main fold which extends towards the outside of the pleated wrapper, and a series of accessory creases of various forms which are called "secondary folds", interspersed between the major spiral and the interior diameter of the pleated wrapper, and which are disclosed, for example, in U.S. Pat. No. 3,907,003 and U.S. Pat. No. 4,210,981.

Casings are also known in the state of the art which can transfer colour to the stuffed meat product produced with them, as is the case of U.S. Pat. No. 2,521,101 (Thor) or US2003/0039724 A1 (Viskase).

Other casings contain a caramel colouring agent which gives a pleasant brown tone to the sausage surface, such as those disclosed in U.S. Pat. No. 3,860,728 or WO 2004/094544 A1 (Teepak).

Other casings contain a product which develops its brown colour by reaction on being subjected to high temperatures as disclosed in U.S. Pat. No. 5,270,067 (Underwood).

There are numerous patents (such as U.S. Pat. No. 4,657,765 Viskase, U.S. Pat. No. 6,032,701 Teepak) designed for the production of casings which transfer liquid smoke to the sausage surfaces, and which replace the need for the smoking step in sausage manufacture.

The impregnation process of the casing with the liquid smoke solution can be carried out in several forms well known in the state of the art, such as those stated in U.S. Pat. No. 4,518,619 (Chiu), thus, the casing can pass through a bath which impregnates it, the liquid smoke can be added by spraying during the pleating process of the casing, or the solution can be introduced in the interior of the casing which is made to slide between rollers ("bubble coating").

U.S. Pat. No. 4,504,500 (Red Arrow) also discloses an impregnation method with liquid smoke of a pleated casing wrapper, wherein the pleated wrapper is placed in contact with the liquid smoke solution, and a differential pressure is applied which forces the flow between the folds of the casing until essentially the entire surface of the casing is uniformly impregnated with the liquid smoke.

Casing impregnation processes (essentially of humidity) are also known, wherein the casing is placed in contact with absorbent and resilient materials such as sponges, such as, for example, in U.S. Pat. No. 3,809,576 and U.S. Pat. No. 4,356,218.

It should be highlighted that, in general, in casings which are impregnated with substances designed to produce a surface colour on the surface of the stuffed meat products, it is aimed that this colour is homogenous, and when lines or marks appear at times, for example, associated to folds of the casing (caused during the production or pleating of the casing), said inhomogeneities are considered defects, as cited in US2003/0039724 A1 (paragraph [0035]) or in U.S. Pat. No. 4,818,551 (Col. 3, Line 10-16; Col. 7, Line 52-65), and although it is known that the pleating folds, if the casing impregnation is inhomogenous, can leave marks on the sausage, this phenomenon, however, although known, has not been advantageously used.

On the other hand, casings are known in the state of the art which can carry a determined drawing or pattern which will then hold the stuffed meat product, such as, for example, U.S. Pat. No. 3,961,082 by Naturin of printed edible collagen.

In U.S. Pat. No. 6,200,510 B1 a spray is applied on the casing in a step prior to its drying (it simulates stripes on the casing which are added before the casing pleating process).

Another technique permits leaving a logo or drawing on the sausage surface as it acts as a screen (mask) to the smoke used in the smoking process, of the logo or drawing printed on the casing with a special composition which is largely impermeable to smoke, as disclosed in U.S. Pat. No. 5,834,076 (Viscofan).

The object of several patents has also been the printing of cellulose casings with logos or marks, especially grill marks, which are transferred to the sausage surface during the cooking process, as disclosed in U.S. Pat. No. 5,084,283 and U.S. Pat. No. 5,085,890 (Viskase). However, this process is complex and entails the expense of an additional printing process and the need to turn the casing inside out during the pleating process, which makes it of little practical use.

In the cooking of heat treated meat products, typically dark coloured marks, called grill-type marks, are produced on their surface, due to the combination of high temperatures on the wires and contact with the food product. These grill-type marks usually follow a typical pattern, which characterizes the appearance of many meat products and are very attractive for the consumer.

The production of grill-type marks on foodstuffs is the object of several patents, such as:

U.S. Pat. No. 4,384,006 with hot wires which come into contact with the food once it advances and rotates, to form an uninterrupted spiral mark on the sausage surface.

U.S. Pat. No. 4,905,587 (Conagra) applies a fine layer of liquid to the meat during its stuffing in the casing, and comments (in column 4, line 65), that it can be adapted to produce grill-type marks.

U.S. Pat. No. 5,762,968 applies a spray of marks imitating grill-type marks, on food products.

Patent application US 2005/0008742 A1 and its equivalent WO 2005/006889 A1 (Red Arrow) provide a method of marking different foods, using jets of colouring solutions which produce marks on the food similar to grill-type marks, and whose colour is developed after the food is subject to a heat treatment.

DESCRIPTION OF THE INVENTION

The present invention relates to a process to produce a casing with marks for the production of stuffed meat products, as well as the casing with marks produced according to said process.

The present invention also relates to a process to produce a meat product with marks, which comprises the use of said casing with marks, as well as the stuffed meat product produced with said casing with marks.

The process to produce the casing with marks used for the production of stuffed meat products, starts from a pleated tubular wrapping, and it is characterized in that it comprises an impregnation stage by means of a colouring composition of at least one sector of the surface of the pleated tubular wrapping. In a particular embodiment, the impregnation of the colouring composition is carried out on the whole outer or inner surface of the pleated tubular wrapping. In another particular embodiment, it is carried out by defining at least one band on the outer or inner surface of the pleated tubular wrapping. In another particular embodiment, it is carried out on at least one continuous longitudinal band on the outer or inner surface of the pleated tubular wrapping. In another particular embodiment, it is carried out on two opposite longitudinal bands on the outer or inner surface of the pleated tubular wrapping.

The process of the invention starts from an initially pleated casing which constitutes a tubular pleated wrapping, wherein the meat product is later introduced.

When the tubular pleated wrapping is impregnated with a colouring band it has been verified that, unexpectedly, after stuffing the casing, the marks produced by this impregnation do not constitute a defect of the final stuffed meat product produced, but it can be advantageously used as a repetitive or sequential series of marks which simulate grill marks on the meat product.

Specifically, when the folds of the pleated wrapping are impregnated by a longitudinal colouring band, it is observed that the stuffed meat product produced with this impregnated casing is provided with a repetitive or sequential series of marks which are distributed in a spiral and which simulate grill marks on the surface of the meat product.

It has been proven that the impregnation of the colouring substance preferably takes place in the major spiral produced during the pleating of the casing and that this spiral is going to be reproduced in the stuffed meat product.

It should be underlined that the present invention takes advantage of the peculiar structure of the pleated casing and the folds it contains, and what in other patents was a defect to avoid (the marks of the pleated folds) is advantageously used in the present invention to offer a product with greater added value.

The total impregnation of the pleated wrapping surface (understanding surface to be the tubular wrapper of the folds of the pleated wrapping) by the method proposed would produce a complete continuous spiral throughout the sausage surface, which would be very difficult to reproduce by printing (since both sides of the casing would have to be printed, perfectly concordant) or by a spray on the sausage surface.

A band can also be impregnated with different possible forms, such as straight line, wavy, zigzag, broken line or as a draughtsboard. These configurations can be visible on the pleated wrapping, however, the visible configuration produced in each sausage is approximately similar.

The impregnation can also be performed in several bands. The impregnation can be performed in two opposite side bands of the pleated wrapping, which would produce, on the stuffed meat products, grill marks on two opposite sides of the sausages. This operation would be very difficult and expensive to repeat if the appearance of grill marks had to be performed by printing the casing (for example, with flexography) since both sides of the casing would have to be printed.

Impregnation by the colouring composition can be performed so that it is deposited on the casing; the colouring composition can be partially absorbed by the casing material. The colouring composition can also migrate or diffuse to the inside of the casing. In a preferred embodiment, the colouring composition can diffuse through the casing and reach the stuffed meat product therein, being coloured during the processing of the stuffed meat product, so that it has the appearance of grill-type marks on its surface even when the casing is removed.

The impregnation of the pleated wrapping of the colouring composition can be performed on its outer or inner side which will then be in contact with the meat composition, or on both. In a particular embodiment, said impregnation is performed throughout the outer or inner surface of the pleated tubular wrapping. Likewise, the impregnation can be performed on one of the sides and the casing be reversed prior to its use.

The pleated wrapping is preferably impregnated in the casing folds which form the "major spiral". If only one section of the circumference of the outer diameter of the pleated wrapping is impregnated, the pieces of impregnated fold would be arranged in an approximately spiral uninterrupted line on the sausage, reminiscent of grill marks.

The casing can incorporate additional compounds; impregnation with the marks does not necessarily entail that it is the only additive, instead, the casing can incorporate additional treatments which affect its surface characteristics, consisting, for example, of a treatment which improves the peeling of the casing, or its adhesion to the meat, or the characteristics of permeability of the casing, or striping, colouring, printing or others, by the use, for example, of easy to peel solutions or food flavourings, printing ink, impermeabilizing substances, liquid smoke or others, whereon the effect of the marks of the colouring composition, which is additionally impregnated, would be added.

Different methods are distinguished to carry out the impregnation of the colouring composition according to the present invention such as immersion, painting, dripping, contact with an impregnated absorbent material, spray diffusion or printing.

In particular, a method to perform the impregnation of the pleated wrapping may consist of immersing the pleated wrapping in a container which contains the colouring composition, which would normally cause the simultaneous impregnation of the exterior and interior of the pleated wrapping. Alternatively, the pleated wrapping can be placed on a container, such as a tray, containing a low level of the colouring composition, and to subject the pleated wrapping to a rotation so that it impregnates its surface with the colouring composition. Preferably, the pleated wrapping is placed in a full container until a determined level of colouring composition, so that when it is introduced, only a narrow band of the outer surface of the pleated wrapping is impregnated. Likewise, the pleated wrapping can also be deposited on a groove which has the same width as the band to impregnate and which contains a well-defined quantity of the colouring composition to be quantitatively captured by the pleated wrapping.

It has been observed that when the colouring composition comes into contact with the folds of the pleated wrapping, the liquid of the colouring composition can be absorbed by the capillarity created between the adjacent folds of the pleated casing. Although this phenomenon is not pernicious for the present invention, it generally leads to a greater dispersion of the colouring composition applied, and to the extension of the area impregnated with respect to the area initially applied, for which reason it is preferable that this capillarity phenomenon is limited or avoided insofar as is possible.

Similarly, the colouring composition may be absorbed by the casing structure, and it can cause a certain diffusion of the colouring compounds. If this diffusion is excessive, it also leads to greater extension of the area coloured with respect to the area initially applied, with an effect of producing wider and more diffuse marks with less intense colour, for which reason it is preferable that this diffusion phenomenon is limited insofar as is possible.

To resolve the aforementioned problem, it has been found that the addition of agents which increase the viscosity of the colouring composition, decreases the mobility of the composition in the casing, which decreases the capillarity between folds of the casing, as well as the diffusion of the colouring composition on the casing, which would produce excessively blurred and imprecise marks, losing colour intensity in the marks, which would need a greater quantity of colouring composition to produce a suitable intensity. This would also avoid having to add greater concentrations of the colouring products to compensate for the blurring effect of the colour on increasing the area of the marks on the casing.

The viscosity of the colouring composition can also advantageously be altered by the temperature; the use of low temperatures during impregnation can increase the viscosity of the colouring composition and decrease its diffusion to the casing. Typically, the impregnation is carried out at a temperature between −10° C. and 25° C. Said colouring composition can be impregnated in liquid, gel or frozen form.

In some cases, the possibility is not rejected that there is a certain diffusion of the stain which gives it a natural appearance, more similar, for example, to the grill marks produced by contact with the grill, which are more intense in the centre of the mark and pale at the edges, and it is an effect difficult to produce with other methods, for example, in the marks produced by spray or by jet spray of colouring solutions.

Other methods for impregnation of the pleated wrapping with the colouring composition may consist of painting with a paintbrush soaked in said colouring composition which is placed in contact with the outer surface of the pleated wrapping, applied once, or if desired, it is possible to perform several successive applications, spaced out in time; in this way, it is easy to dispense the required quantity of colouring solution, which would be added to the paintbrush prior to painting of the pleated wrapping. Said brush may optionally be located in the pleating machine, and a band can be impregnated on the pleated wrapping whilst this is longitudinally displaced on the pleating machine, so that it avoids the addition of subsequent stages in the processing of the pleated casing.

The impregnation of the colouring composition may also be performed by placing an absorbent material in contact with the pleated wrapping, such as a sponge, soaked in the colouring composition.

The absorbent material can adopt several forms, such as an elongated strip which longitudinally cuts into the pleated wrapping to leave a band of the colouring composition, or it can be a wheel of spongy material which rotates on the outer surface of the pleated wrapping and whereto the necessary quantity of colouring composition is added. This absorbent material can optionally be positioned on the pleating machine, which would avoid the addition of subsequent steps in the processing of the pleated casing. This absorbent material could also consist of a filter paper soaked in the colouring composition; this filter paper may optionally be positioned between the layers of pleated wrappers which are packaged together for their sale to the meat product manufacturer, which would avoid the addition of subsequent steps in the processing of the pleated casing.

The impregnation of the colouring composition may optionally lead to an additional draining stage, which decreases the excess colouring composition on the pleated wrapping, for example, draining by gravity of the colouring liquid not impregnated in the casing, or an absorption with an absorbent material (for example, filter paper or with a sponge) which absorbs the unwanted excess colouring composition.

The impregnation of the pleated wrapping with the colouring composition can also be performed by dripping of the colouring composition on the surface of the pleated wrapping.

The pleated wrapping can also be impregnated with the colouring composition by a spray (such as an inkjet printed), or with an aerograph, for example, which prints on the pleated wrapping without the need for physical contact. Optionally, the impregnation performed with the spray can be performed on a mask which clearly delimits the surface of the pleated wrapping and avoids the undesired impregnation of other areas.

The colouring composition may also be impregnated by contact with a semi-solid material, such as a gel. The colouring composition can be in the form of a gel. When the colouring composition is placed in contact with the surface of the pleated wrapping for a certain time, a diffusion of the colouring substances may occur to the casing due to migration. An advantage of the use of gel compared to use of a liquid, consists, in this case, of avoiding the presence of a free liquid on the surface of the pleated wrapping, which would have the tendency to rise by capillarity between the adjacent folds of the casing and to cause less regular impregnation.

Likewise, the colouring composition may also be impregnated by depositing, in contact with pleated wrapping, a layer that includes the colouring composition. For example, a strip of semisolid gel (or in cream state) which includes the colouring composition can be deposited as a band on the pleated wrapping to provide a very regular quantity of colouring composition per centimeter of pleated wrapping. A thin strip of frozen colouring composition can also be deposited as a band on the pleated wrapping.

The colouring composition impregnated on the pleated wrapping produces marks on the casing. Optionally, these marks can simulate grill-type marks.

Optionally, the marks produced by the colouring composition can migrate from the casing to the meat product during its processing, which means they remain on the meat product even though the casing is peeled off as typically occurs with cellulose casing. Optionally, the marks produced by the colouring composition may remain on the casing, for example, to give the appearance of grill-type marks to the stuffed meat product or for the identification of the meat product by the meat product manufacturer or to detect the remains of casing that has not been peeled off; in this case, it would be preferable that the colouring composition does not migrate to the meat product, and even that the casing containing the identification marks or peeling warning marks is peeled off and removed from the stuffed meat product once the stuffed meat product has been produced.

The colouring composition designed to be impregnated in the pleated wrapping for the production of marks may comprise one or more known colouring substances and, optionally, one or more coadjuvant compounds.

The colouring composition may contain as colouring substance, a compound selected from liquid smoke, caramel, caramel fractions, food colouring, a reducing sugar, hydroxyacetaldehyde, Maillose and their mixtures.

In a particular embodiment said composition may comprise liquid smoke, in which case the colouring composition produces grill-type marks of dark appearance (depending on the concentration and quantity of the liquid smoke used). The colouring composition may contain in another embodiment a compound as colouring substance which produces the colour by reaction with the food product, with the casing or with both at high temperatures. In this regard, the colouring composition may comprise a reducing sugar such as glucose, dextrose, fructose, galactose, lactose, maltose, mannose, fucose, xylose, erythrose, threose, corn syrup, fructose-rich corn syrup, maple syrup, whey, honey, molasses, burned sugar, starch in dextrinization process and their mixtures. In another particular embodiment, said composition comprises hydroxyacetaldehyde. In a preferred embodiment Maillose is used.

Likewise, compounds can also be added to the colouring composition or the casing, which react with the aforementioned products to produce colour such as proteins like albumin, collagen or gelatine, caseinate or amino acids such as glycine or lysine. A protein can be added, for example, to the easy peel solution which is sprayed on the casing during the pleating, such as gelatine, which reacts with the aforementioned compounds to produce colour, and in this way fixes it on reacting with the protein and avoids its subsequent diffusion which would give a stain which is much less clear. Thus, on the one hand the colouring compounds which diffuse through the casing wall can react, and on the other hand the protein which covers the inner wall of the casing can react, to form coloured compounds with a much lower tendency to diffuse than the free colouring components and which remain on the sausage surface to give less diffuse bands, which are sharper, and with less risk of being dragged by the possible sausage washing showers.

In another particular embodiment the colouring composition contains as colouring substance, caramel or its fractions; in this way, the marks will take on a brown colour which is more or less dark according to the concentration and colouring power of the caramel used. In another particular embodiment, the colouring composition comprises a food colouring, which produces the desired tone of the marks. In another particular embodiment, the composition comprises a food substance or an extract which is characterized in that it produces a desired colour, such as, for example extracts of teas, chocolate, malt, extract of toasted cereals, among others.

The colouring composition may also contain a mixture of the above colouring substances or of other colouring substances.

The colouring composition may additionally contain other components, in addition to the colouring compounds, which aid it to perform different functions. Thus, the colouring composition may contain thickening agents such as hydrocolloids, which modify the viscosity of the colouring composition and which reduce excessive absorption by capillarity between folds of the pleated wrapping. These agents may include, among others, carboxymethylcellulose (CMC) methylcellulose (MC) or other cellulose ethers, carrageenan, guar gum, locust bean gum, starch, gelatine, pectin, agar, alginate, gellan gum or other viscosity modifying agents.

The colouring composition may additionally contain other components which modify the diffusion of the colouring composition to the casing, to delay the absorption of the solution added during the pleating, such as polyols, for example glycerol or propylene glycol, or sugars such as sucrose, glucose or fructose. These compounds may decrease the tendency of water to being captured quickly by the artificial casing, and therefore, decrease the rapid absorption of the water and the colouring substances dissolved therein, thus decreasing in a certain way the diffusion of the colouring composition in the casing structure, which could cause excessively diffuse and pale marks on the casing. The casing may also have a quantity of altered polyols which modify absorption of the colouring composition by the casing and favours the formation of suitable marks.

Likewise, the colouring may additionally contain other components which modify absorption of the colouring compounds by the casing, such as surfactants such as, for example, Polisorbate 80, sodium dodecyl sulphate or other surfactant agents.

The colouring composition may also contain other additional compounds such as pH regulators, stabilizing agents, antioxidants, colouring composition preservatives, chelating agents (which may avoid the formation of black stains in the impregnation of the cellulose casing due to liquid smoke) or other compounds which may be necessary.

The casings used can be of several types. In a preferred embodiment of the invention, the casing to impregnate with the colouring composition is a low-calibre cellulose (manufactured from derivatized or non-derivatized cellulose). If the casing is designed to be peeled off before its use for the production of the stuffed meat product, it is preferable that the colouring composition migrates to the sausage surface to leave marks thereon, as is the case of grill-type marks. If the casing is going to be kept on the stuffed meat product until its consumption, the marks can optionally remain on the casing surface.

The casing to impregnate can also be an artificial casing of regenerated collagen, and can be ingested together with the stuffed meat product or peeled off if necessary. If the casing remains on the stuffed meat product until its consumption, it is preferable that the marks remain on the casing surface, without migrating to the stuffed meat product, and in this case it is preferable to use a colouring composition which reacts with the collagen and immobilizes it in this way, or a colouring composition that does not migrate to the casing surface.

The casing to impregnate can also be cellulose (manufactured from derivatized or non-derivatized cellulose) reinforced with a fibrous material.

The casing to impregnate can also be a casing manufactured with a polymeric material (such as the plastic casing). In this case, the impregnation of the casing with the colouring composition may preferably be performed on the inner surface of the casing which is going to be in contact with the meat product, since the diffusion through the wall of the casing may be decreased. Alternatively, impregnation of the casing with the colouring composition can be performed on the exterior of the casing, and then the casing turned inside out prior to its stuffing.

The process to produce the casing with marks of the present invention can be combined with other types of treatments which affect its surface characteristics of adherence, colour, permeability, design and others prior to the impregnation stage of the colouring composition. In a particular embodiment, the casing incorporates a compound selected from the group of proteins and the diffusion modifying agents of the colouring composition in the casing before the impregnation stage is carried out by means of at least one sector of the surface of the pleated tubular wrapping.

Likewise, a smoking process can be performed by smoke in gaseous state or liquid smoke, which provides the suitable tone to the sausage in general. The impregnation stage of the colouring composition can also be combined with other existing treatments of the casing, such as the action of solutions during the pleating which facilitate the easy peeling of the casing, the impregnation of the casing with solutions of liquid smoke or compounds which develop a brown colour, colouring agents in the gel state of the casing prior to its drying or all type of known treatments on the casing or sausage.

The process of the present invention starts from a pleated tubular wrapping. In the pleating stage of the casing, it is preferable that the pleating does not cause folds in a disorderly or random manner, but that the pleating produces folds according to a repetitive pattern, so that a repetitive pattern of marks can then be produced on the stuffed meat product. A pleating method which produces a major spiral on the surface of the pleated wrapping is preferable, or another pleating technology which produces a major spiral on the surface of the pleated wrapping, or another series of repetitive folds, such as, for example, folds with a structure similar to the folds of an accordion. In a preferred embodiment, the pleating of the casing consists of folding with the formation of a major spiral on the outer surface of the pleated wrapping.

The secondary folds of the pleating of the pleated wrapping generally cause a fold of the casing which can be marked by capillarity of the liquid of the colouring composition; generally, these secondary folds have a different orientation to those of the fold of the casing's major spiral, and its marking with the colouring composition would interfere with the pattern of marks produced by the fold of the major spiral. In the development of the present invention, it is permitted that the secondary folds be marked by the colouring composition to a certain extent, preferably in a random manner, and they can even cross over with the fold of the major spiral to give a design in the form of blades. Preferably, the secondary folds do not cross, intersect or interfere with the fold of the major spiral and are not coloured.

The pleating of the wrapping can vary the distance of the blade pitch of the major spiral, in accordance with the corresponding pleating parameters. In this way, the inclination of the spiral mark can vary with respect to the longitudinal axis of the sausage and the periodic separation or distance between the corresponding marks produced by the major spiral of the casing, altering the corresponding pleating parameters. Thus, different food products can be produced, for example, sausages, with marks spaced regularly between one another with a different distance, or with different inclinations of the marks with respect to the sausage axis, or with marks that form a complete spiral on the sausage surface with the desired blade pitch. The distance between marks, their inclination or the blade pitch of the spiral can thus vary.

The wrapping pleating also influences the difference between the folds of the casing and in its size exposed to contact with the colouring composition. A longitudinal section of a pleated wrapping shows that the folds are stacked one on top of the other, with a certain angle of inclination with respect to the longitudinal axis of the pleated wrapping, called cone angle.

The general aim is to increase the ratio between the original length of the casing without pleating and the length of the pleated wrapping to increase the efficiency of the use of the pleated casing by the meat product processor.

All these parameters of wrapping pleating determine the arrangement of the folds which form the outer surface of the pleated wrapping, which are found overlapped like slates on a roof.

The wrapping pleating determines the inclination of the folds with respect to the axis of the pleated wrapping, as well as the distance of one fold to the next and the exposed area of each fold. All these factors later influence the impregnation with the colouring composition.

The exposed area of each fold on the pleated wrapping surface will be the casing area which can be impregnated with greater ease when it comes into contact with the colouring composition, which means that if this exposed area of each fold is greater in one pleated wrapping the grill-type mark will be wider than in another situation where the exposed area of casing in each fold is less.

The physical distance between consecutive folds will also influence impregnation, since if a space is formed between two consecutive folds, the phenomenon of capillarity of the liquid the colouring composition may carry can increase, giving rise to grill-type marks, which are more extensive or blurred than those originally applied.

The inclination of the folds can also influence impregnation, for example, when the colouring composition is impregnated by applying and moving a paintbrush impregnated with said colouring composition over the surface of the pleated wrapping, and if the impregnation is performed in the direction of the inclination of the folds or in the opposite direction.

The process to produce a casing with marks which constitutes an object of this invention, in accordance with that set down in claim 1, starts from a casing whereon a pleating operation is performed to produce a pleated tubular wrapping and basically consists of impregnation by means of a colouring composition on at least one sector of the surface of the pleated tubular wrapping.

To produce the meat product with marks, a phase is included consisting of the incorporation of the meat dough, whereon, optionally, the colouring composition of the casing will migrate, giving rise to a meat product whereon the casing marks are reproduced.

The present invention also provides a process for the production of a meat product with marks stuffed in the casing with marks provided by the present invention, as well as said stuffed meat product with marks produced by said process.

In a particular embodiment, said production process is characterized in that migration of the colouring composition occurs from the casing towards the meat dough during the stuffing and processing of the meat dough in the pleated tubular wrapping.

DESCRIPTION OF THE DRAWINGS

To complement the description being made and with the object of helping towards a better understanding of the characteristics of the invention, in accordance with a preferred example of practical embodiment thereof, a set of figures is attached as an integral part of the description, wherein the following has been represented with an illustrative non-limitative character:

FIG. 1 B. Shows the same pleated wrapping, whereon an impregnation band of a colouring composition has been applied.

FIG. 2 B. Shows a piece of unpleated casing from a pleated wrapping whereon an impregnation band of colouring composition has been applied, wherein the repetitive marks of the colouring composition are observed, which are located on the major spiral of the folds of the pleated wrapping.

FIG. 2 C. Shows another piece of unpleated casing from a pleated wrapping whereon the outer surface of the pleated wrapping had been impregnated, wherein it is observed that the colouring composition is located following the major spiral of the folds of the pleated wrapping.

EXAMPLES OF EMBODIMENT OF THE INVENTION

Example 1

Figure 1A:
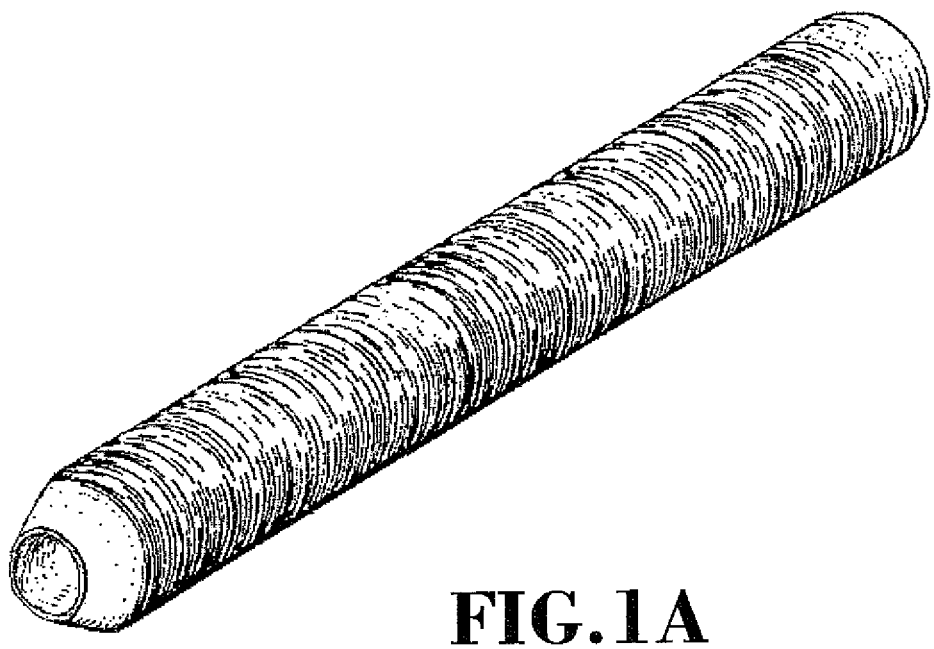
FIG. 1 A. Represents a pleated wrapping.
Figure 1B:
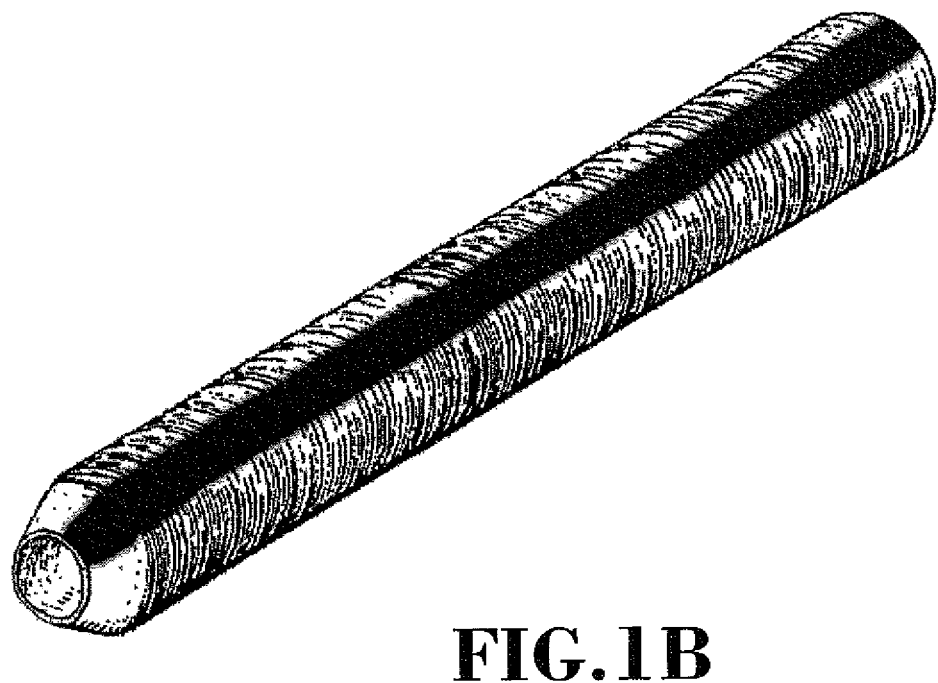
Figure 2A:
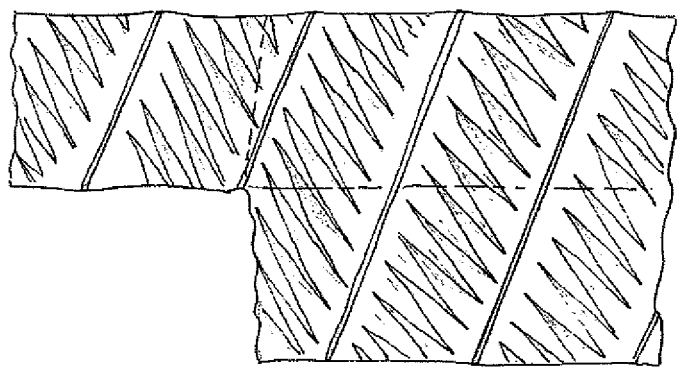
FIG. 2 A. Shows a piece of unpleated and partially open casing, where the different creases produced during the pleating are observed.
Figure 2B:
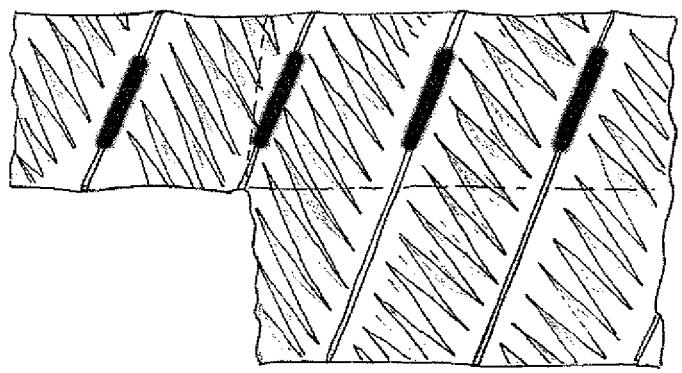
Figure 2C:
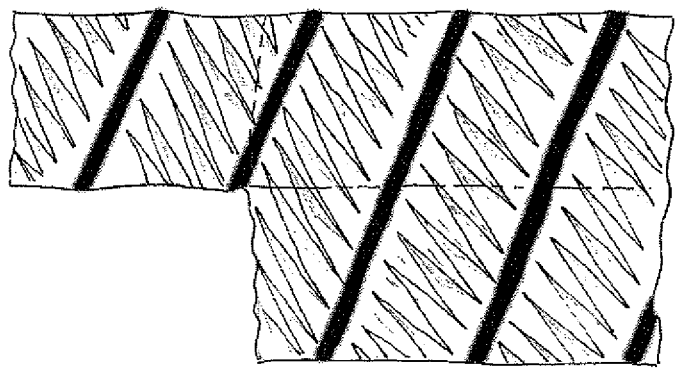
Figure 3A:
FIG. 3 A. Shows a sausage produced with the casing of FIG. 2B, wherein a repetitive pattern of elongated and inclined marks are observed on the sausage surface, and which are similar to grill marks.
FIGS. 3B and 3C. Show sausages produced with the casing of FIG. 2C, wherein the sausages are surrounded by a coloured spiral band which is similar to a continuous grill mark, ("barber-pole" type), showing, in FIG. 3C, the complete band represented with a broken line on its rear surface.
Figure 3B:
Figure 3C:
Figure 4:
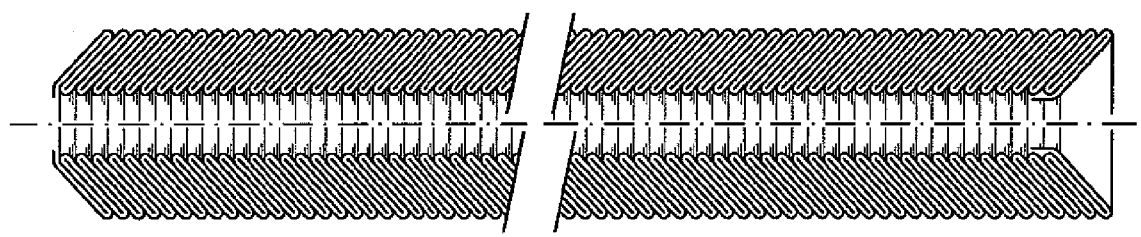
FIG. 4. Shows a section of the pleated wrapping, wherein the arrangement of the folds of the casing which form the pleated wrapping are observed.
Figure 5A:
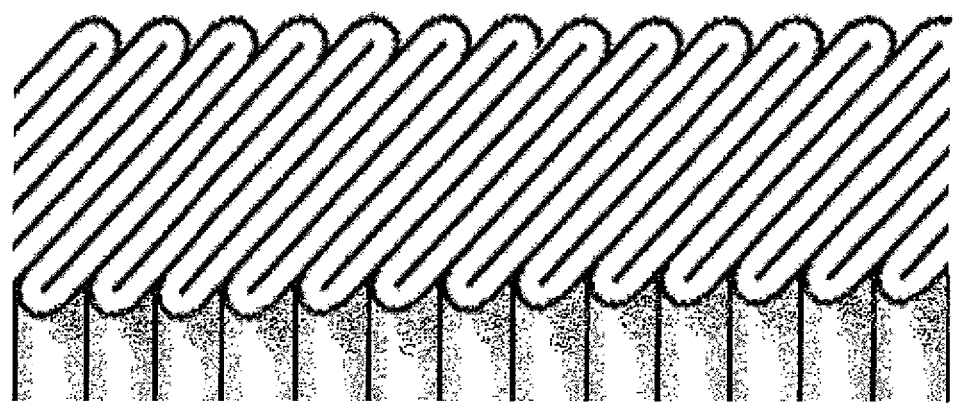
FIG. 5A. Shows a detail of the casing folds which are found forming the outer surface of the pleated wrapping.
Figure 5B:
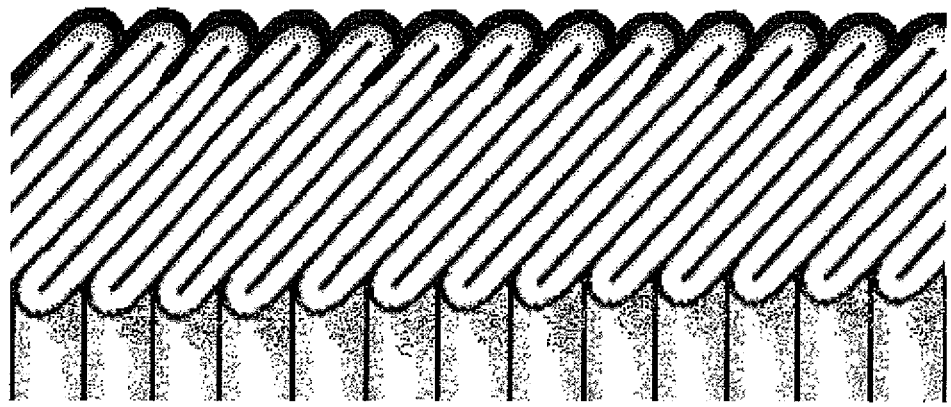
FIG. 5B. Shows a detail of the casing folds which are found forming the surface of the pleated wrapping, coated by the colouring composition, part of which may be deposited on the folds of the pleated wrapping, another diffused part within the casing wall and another part absorbed by capillarity in the space between adjacent folds of the pleated wrapping.

A band of liquid smoke (Red Arrow Smoke-EZ LFB Supreme) was impregnated on the outer surface of a pleated wrapping of cellulose casing with calibre 23 using a paintbrush. A piece of the pleated wrapping was unpleated to show that the casing had a spiral fold throughout its surface, which was marked at regular intervals in the areas where it had been impregnated with liquid smoke. The pleated wrapping was later stuffed with meat emulsion and sausages were manufactured with a standard cycle. The sausages produced with this casing had a repetitive pattern of elongated and inclined stains with respect to the longitudinal axis of the sausage, which is similar to the grill marks produced by applying a grilling process to the sausages.

Example 2

A colouring composition was prepared which contained Maillose 60 (Red Arrow) with 1.5% methylcellulose (Methocel PA 125) and it was placed on a tray with a liquid depth of 2 mm. A pleated wrapping of cellulose casing with calibre 24 was deposited on the tray and the tray was made to rotate so that the entire outer surface of the pleated wrapping became impregnated. The pleated wrapping was removed and the excess liquid was eliminated with filter paper; the quantity impregnated corresponded to 140 mg of the colouring composition per linear meter of casing. The pleated wrapping was later stuffed with meat emulsion and sausages were manufactured with a standard cycle. The cellulose casing was then peeled off and discarded. The sausages produced had been marked by the Maillose diffused through the cellulose casing and had, throughout its surface, a continuous spiral mark similar to a "barber-pole".

Example 3

A colouring composition was prepared formed by Maillose 45 (Red Arrow) with 0.1% sodium carrageenan. The mixture was heated at 90° C. and then left to cool, until attaining a semi-solid consistency. A pleated wrapping of cellulose casing with calibre 24 was deposited on the colouring composition, so that a band was impregnated on the outer surface of the pleated wrapping, maintaining it during 60 seconds. The pleated wrapping was then removed and the sausages were processed with it. The sausages produced with this casing, has a repetitive pattern of elongated stains on the surface similar to grill marks. The marks were finer, sharper and more intense than those produced in Example 1.

Example 4

A band of Caramel (Metarom) was impregnated on a pleated wrapping of collagen casing with calibre 21 using a paintbrush. The coloured band had an approximate width of 1.5 cm and represented 25% of the casing circumference. The pleated wrapping was later stuffed with meat emulsion and "wiener" sausages were manufactured. After the processing, the sausage surfaces had a repetitive pattern of elongated stains, similar to grill marks. The casing with the colouring agent can be consumed with the sausage.

Example 5

Two opposite bands of Maillose 45 (Red Arrow) were impregnated, containing 2% methylcellulose Methocel PA 125 on the outer surface of a pleated wrapping of collagen casing with calibre 21 using a paintbrush. The coloured band had an approximate width of 1.5 cm and represented 25% of the casing circumference. The pleated wrapping was later stuffed with meat emulsion and "wiener" sausages were manufactured". After the processing, the sausage surfaces had on two diametrically opposing surfaces a repetitive pattern of elongated stains, of caramelized colour, probably due to the reaction of the Maillose with the collagen of the casing, similar to grill marks. The casing with the colouring agent can be consumed with the sausage.

The invention claimed is:

1. A process for producing a casing with elongated grill marks used for the production of stuffed meat products, based on a pleated tubular wrapping, comprising the step of: impregnation by means of a colouring composition of at least one longitudinal band on the surface of the pleated tubular wrapping.

2. The process for producing a casing with marks used for the production of stuffed meat products according to claim 1, wherein the impregnation of the pleated tubular wrapping is carried out by a method or combination of methods selected from immersion, painting, dripping, contact with an impregnated absorbent material, diffusion of spray or impression.

3. The process for producing a casing with marks used for the production of stuffed meat products according to claim 1, wherein the colouring composition is impregnated in the form of liquid, gel or frozen.

4. The process for producing a casing with marks used for the production of stuffed meat products according to claim 1, wherein the impregnation is carried out at a temperature between −10° C. and 25° C.

5. The process for producing a casing with marks used for the production of stuffed meat products according to claim 1, wherein after the impregnation, an additional step of draining is performed to decrease the undesired excess colouring composition.

6. The process for producing a casing with marks used for the production of stuffed meat products according to claim 1, wherein the impregnation of the colouring composition is carried out on all of the outer or inner surface of the pleated tubular wrapping.

7. The process for producing a casing with marks used for the production of stuffed meat products according to claim 1, wherein two opposite longitudinal bands are impregnated on the outer or inner surface of the pleated tubular wrapping.

8. The process for producing a casing with marks used for the production of stuffed meat products according to claim 1, wherein the colouring composition comprises at least one colouring substance which is selected from liquid smoke, caramel, caramel fractions, food colouring agents, reducing sugar, hydroxyacetaldehyde, maillose and their mixtures.

9. The process for producing a casing with marks used for the production of stuffed meat products according to claim 8, wherein said reducing sugar is selected from glucose, dextrose, fructose, galactose, lactose, maltose, mannose, fucose, xylose, erythrose, threose, corn syrup, fructose-rich corn syrup, maple syrup, whey, honey, molasses, burned sugar, starch in dextrinization process and their mixtures.

10. The process for producing a casing with marks used for the production of stuffed meat products according to claim 1, wherein the colouring composition comprises at least one compound selected from the group consisting of proteins, thickening agents, diffusion modifying agents of the colouring composition in the casing, surfactant agents, pH regulators, stabilizing agents, preservatives, antioxidants, chelating agents and their mixtures.

11. The process for producing a casing with marks used for the production of stuffed meat products according to claim 1, wherein the casing used is selected from the group consisting of low-calibre cellulose casing, regenerated collagen casing, cellulose casing reinforced with fibrous material, and plastic casing.

12. The process for producing a casing with marks used for the production of stuffed meat products according to claim 1, wherein the casing is subjected to treatments which affect its surface characteristics of adherence, colour, permeability and design prior to the impregnation of the colouring composition.

13. The process for producing a casing with marks used for the production of stuffed meat products according to claim 12, wherein the casing incorporates a compound selected from the group of proteins and diffusion modifying agents of the colouring composition prior to the impregnation of said colouring composition.

14. The process for producing a casing with marks used for the production of stuffed meat products according to claim 1, wherein the pleating of the casing consists of folding with the formation of a major spiral on the outer surface of the pleated wrapping.

15. The process for producing a casing with elongated grill marks used for the production of stuffed meat products according to claim 1, further comprising adding a viscosity-increasing agent to the colouring composition before the colouring is applied to the surface of the pleated tubular wrapping to decrease the capillary movement of the coloring composition between the folds of the pleated tubular wrapping.

16. The process for producing a casing with elongated grill marks used for the production of stuffed meat products according to claim 1, wherein the coloring composition is applied in the form of a gel.

* * * * *